Dec. 21, 1937.   C. NELSON   2,102,908
PRESSURE COOKER
Filed Aug. 19, 1935
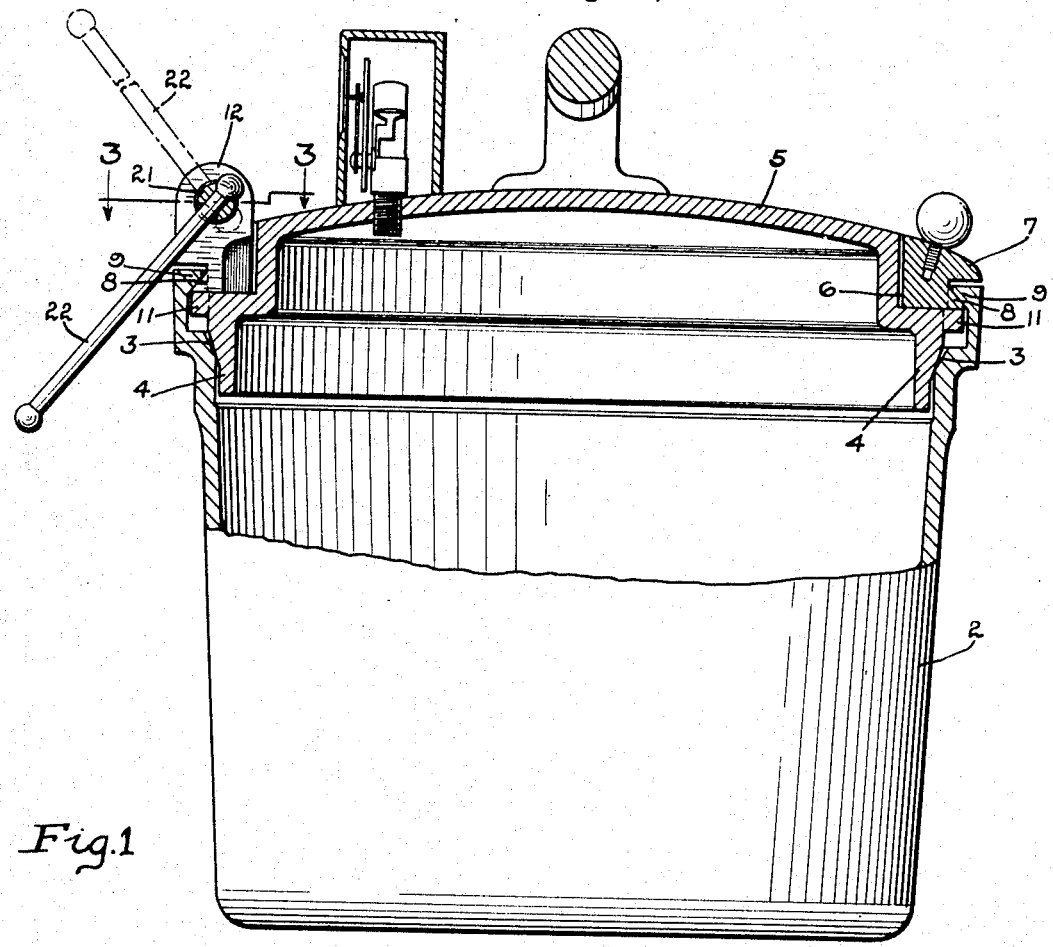
Fig.1
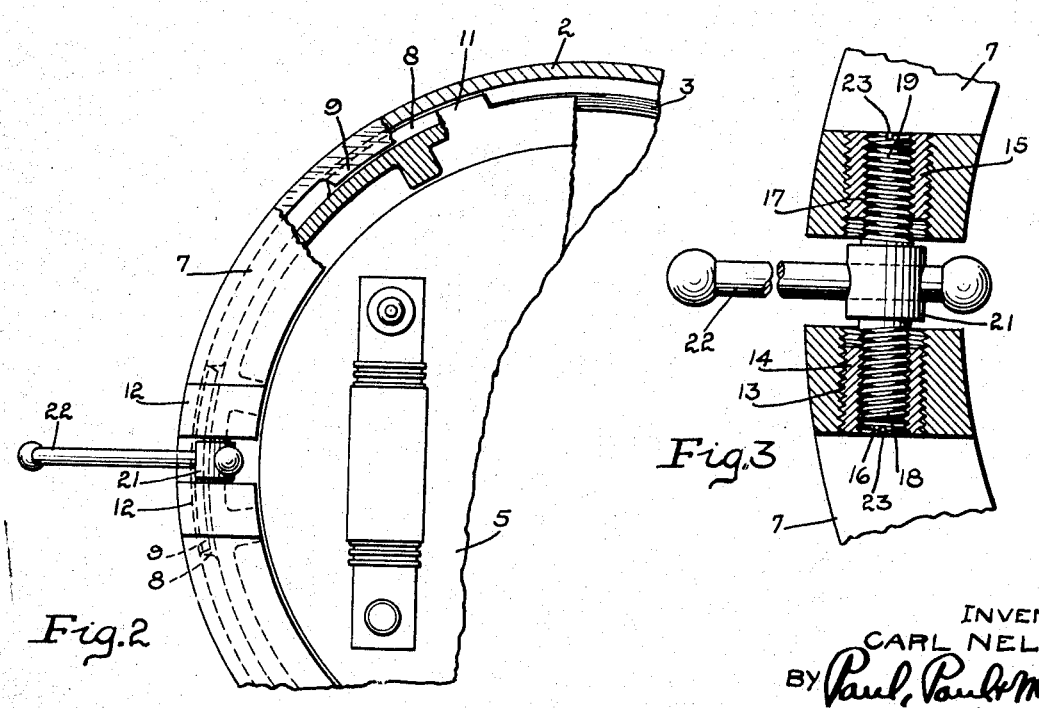
Fig.2
Fig.3
INVENTOR
CARL NELSON
BY Paul, Paul & Moore
ATTORNEYS Patented Dec. 21, 1937

2,102,908

UNITED STATES PATENT OFFICE 2,102,908

PRESSURE COOKER

Carl Nelson, Eau Claire, Wis., assignor to National Pressure Cooker Company, Eau Claire, Wis., a corporation of Wisconsin Application August 19, 1935, Serial No. 36,874

4 Claims. (Cl. 220—61)

This invention relates to new and useful improvements in pressure cookers, and more particularly to a novel means for securing the closure to the cooker body in steam-tight relation.

An object of the present invention is to provide a closure locking means comprising a split lock ring having a stud received in threaded engagement with the ends thereof for expanding and contracting the same, and the ends of the lock ring having means therein for relatively adjusting the ends of the ring without rotating the stud, thereby to take up wear in the parts so that the expansion and contraction of the lock ring may be accomplished by a predetermined movement of the stud.

A further object is to provide a device for varying the spacing between two bodies, comprising a stud having oppositely disposed right and left hand terminals, and threaded sleeves operatively connecting the terminals of the stud to the bodies, and whereby said bodies may be relatively adjusted with respect to each other without relatively moving the stud.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a view showing the invention embodied in the construction of a pressure cooker;

Figure 2 is a plan view of a portion of the cooker, showing the interlocking means between the lock ring and the cooker body; and Figure 3 is an enlarged detail sectional view on the line 3—3 of Figure 1, showing the means for taking up wear in the lock ring and the stud for operating the same.

In the selected embodiment of the invention here shown, there is illustrated in Figure 1, a pressure cooker of the general type disclosed in my pending application, Serial No. 750,197, filed October 26, 1934. This cooker is shown comprising a body 2 having an annular seat 3 at its upper end adapted to be engaged by a depending flange 4 provided upon a suitable closure 5. The closure 5 is shown provided with an annular recess 6 adapted to receive a lock ring 7 having a plurality of spaced projections 8 adapted to interlockingly engage inwardly extending projections 9 provided upon the upper edge of the cooker body 2.

The lugs 8 on the lock ring are spaced apart to receive the lugs 9 on the cooker body, to permit the lock ring to be removed from the cooker body when the closure is to be removed therefrom. The closure 5 is also provided with a plurality of radial lugs 11, which are of such size that they may readily pass between the lugs 9 of the cooker body.

An important feature of the present invention resides in the novel means for expanding or contracting the lock ring 7, in the operation of securing the cover to the cooker body or releasing it therefrom. To thus expand or contract the lock ring, it is shown provided at its ends with a pair of upstanding lugs 12 provided with threaded sockets 13, in which threaded sleeves 14 and 15 are mounted, as best shown in Figure 3. The threaded sleeves 14 and 15 are provided with right and left hand threaded sockets 16 and 17, respectively, adapted to receive the correspondingly threaded terminals 18 and 19 of a stud 21, the body of which is shown interposed between the adjacent ends of the lock ring. The body 21 of the stud is bored to receive an operating bolt or handle 22, which is slidable therein, and provides means whereby the stud may readily be rotated to contract or expand the ring, as will be readily understood by reference to Figure 3.

The threaded sleeves 14 and 15 are important in that they provide means whereby the ends of the lock ring may be so adjusted with respect to each other that when the operating handle 22 is moved from the full line position, shown in Figure 1, to the dotted line position shown in the same figure, the lock ring will be expanded sufficiently to secure the closure 5 to the seat 3 in steam-tight relation. When the operating lever is rotated from the dotted to the full line position, shown in Figure 1, the lock ring is contracted sufficiently to permit the lock ring to be rotated upon the closure 5, whereby its lugs 8 may be moved into registration with the spaces between the lugs 9 of the cooker body, to thereby permit the removal of the lock ring from the closure. Such removal of the lock ring may release the closure, whereupon it may disengage the seat 3.

Before the closure can be completely removed from the cooker body, it must be relatively rotated with respect thereto, to bring its lugs 11 into registration with the spaced lugs 9 of the cooker body, whereby it may readily be removed therefrom. By thus arranging the closure, it cannot be completely blown off the cooker body, when the lock ring is removed therefrom, which is important in structures of this character.

The threaded sleeves 14 and 15, are preferably slotted at their outer ends, as shown at 23 in Figure 3, whereby they may be conveniently rotated with a screw driver to take up wear in the parts, and to relatively adjust the parts to compensate for variations which may occur in the machining of the various parts of the structure. Thus, the operating handle 22 may always be operated substantially within the angle shown by the full and dotted lines in Figure 1, to contract or expand the lock ring in the operation of securing the closure to the cooker body, or removing it therefrom.

I claim as my invention:

1. A pressure cooker comprising a body provided with a suitable closure, a split lock ring engageable with the closure and having means for wedgingly engaging means on the cooker body to secure the closure thereto, a stud having right and left hand threaded terminals, threaded elements adjustably mounted in the ends of the lock ring and having threaded apertures for receiving the threaded terminals of the studs whereby rotation of the stud will contract or expand the ring, said threaded elements providing means whereby the gap between the ends of the lock ring may be varied without relatively rotating the stud, thereby to compensate for wear in the parts, so that the lock ring may be expanded to tightly secure the cover to the cooker body by only slightly rotating the stud.

2. A pressure cooker comprising a body provided with a suitable closure, a split lock ring seated on the closure and having means for wedgingly engaging means on the cooker body to secure the closure thereto, a stud having oppositely disposed right and left hand threaded terminals, a sleeve received in threaded engagement with each end of the lock ring and adapted for independent adjustment therein, said sleeves having threaded apertures for receiving the threaded ends of the stud, and means whereby said sleeves may be conveniently adjusted in the lock ring to vary the gap between the ends thereof and whereby the lock ring may be expanded to secure the closure to the cooker body by a partial rotation of the stud.

3. A pressure cooker comprising a body provided with a suitable closure, a split lock ring seated on the closure and having means for engaging means on the cooker body, when said ring is expanded, thereby to secure the closure to the cooker body in leak-proof relation, a stud having right and left hand threaded terminals, sleeves received in threaded engagement with the ends of the lock ring and having threaded apertures adapted to receive the threaded terminals of the stud, an operating handle on the stud for relatively rotating the same to expand or contract the ring, and means whereby said sleeves may be independently adjusted in the lock ring, thereby to vary the gap between the ends of the ring to compensate for wear, and whereby the ends of the lock ring may be so positioned that the operating handle of the stud may normally operate within a predetermined angle to secure the closure to the cooker body or release it therefrom.

4. A pressure cooker comprising a body provided with a suitable seat, a closure adapted to be received in said seat, a split lock ring, means on the lock ring adapted to engage means on the cooker body to secure the closure to said seat when the lock ring is expanded, and means for expanding said lock ring comprising a stud having its ends operatively connected to the ends of the lock ring, said stud having threaded terminals, a sleeve received in threaded engagement with one end of the lock ring and having a threaded socket for receiving the threaded terminal of said stud, and whereby relative rotation of the stud will contract or expand the lock ring, and means whereby said sleeve may be conveniently adjusted in the lock ring to vary the gap between the ends of the ring independently of said stud, thereby to compensate for wear in the parts, and also whereby the connection between the stud and the lock ring may be so adjusted as to permit the stud to be rotated within a predetermined portion of a revolution to secure the cover to the closure or release it therefrom.

CARL NELSON.